US012640145B2

(12) United States Patent
Fan et al.

(10) Patent No.: US 12,640,145 B2
(45) Date of Patent: May 26, 2026

(54) DATA PROCESSING METHOD, APPARATUS, DEVICE, STORAGE MEDIUM AND PROGRAM PRODUCT

(71) Applicant: BEIJING SOGOU TECHNOLOGY DEVELOPMENT CO., LTD., Beijing (CN)

(72) Inventors: Ziwei Fan, Beijing (CN); Jiqing Zhan, Beijing (CN); Jian Yu, Beijing (CN); Yanfeng Wang, Beijing (CN); Yun Zhu, Beijing (CN); Ang Zhao, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 403 days.

(21) Appl. No.: 18/201,103

(22) Filed: May 23, 2023

(65) Prior Publication Data

US 2024/0395247 A1 Nov. 28, 2024

Related U.S. Application Data

(63) Continuation of application No. PCT/CN2022/112643, filed on Aug. 16, 2022.

(30) Foreign Application Priority Data

Sep. 17, 2021 (CN) .......................... 202111094328.0

(51) Int. Cl.
*G10L 15/18* (2013.01)
*G06N 20/00* (2019.01)
(Continued)

(52) U.S. Cl.
CPC ............ *G10L 15/187* (2013.01); *G06N 20/00* (2019.01); *G10L 15/063* (2013.01); *G10L 15/22* (2013.01)

(58) Field of Classification Search
CPC ....... G10L 15/187; G10L 15/22; G10L 15/26; G06N 20/00; G06N 3/044; G06N 3/045;
(Continued)

(56) References Cited

U.S. PATENT DOCUMENTS

| 10,304,444 B2 * | 5/2019 | Mathias | ................... G10L 15/22 |
| 2020/0243094 A1 * | 7/2020 | Thomson | ................ G10L 15/28 |

(Continued)

FOREIGN PATENT DOCUMENTS

| CN | 107767870 A | 3/2018 |
| CN | 110110327 A | 8/2019 |

(Continued)

OTHER PUBLICATIONS

Tiffany Chien et al., "Adversarial Analysis of Natural Language Inference Systems", IEEE 14th International Conference on Semantic Computing (ICSC), DOI: 10.1109/ICSC.2020.00008. Feb. 2020, 8 pgs.

(Continued)

*Primary Examiner* — Mark Villena
(74) *Attorney, Agent, or Firm* — Morgan, Lewis & Bockius LLP

(57) ABSTRACT

This application discloses a data processing method performed by a computer device. Obtained service data is inputted into a pre-trained model and an initial service model to obtain first fully-connected layer outputs of the pre-trained model and second fully-connected layer outputs of the initial service model. The pre-trained model and the initial service model construct modeling units with different granularities, first modeling units of the pre-trained model are matched with second modeling units of the initial service model, fully-connected layer outputs of the second modeling units have the same sequence length as fully-connected layer outputs of matched target first modeling units so that with (Continued)

the assistance of the pre-trained model, the target service model can be obtained through the initial service model, the knowledge distillation of the models including modeling units with different granularities is realized, thereby effectively improving the service performance of the service model.

18 Claims, 4 Drawing Sheets

(51) Int. Cl.
G10L 15/06 (2013.01)
G10L 15/187 (2013.01)
G10L 15/22 (2006.01)

(58) Field of Classification Search
CPC .......... G06N 3/08; G06N 5/02; G06F 18/214; G06F 18/22; G06F 40/284; G06F 40/289
See application file for complete search history.

(56) References Cited

U.S. PATENT DOCUMENTS

| | | | | |
|---|---|---|---|---|
| 2020/0380211 A1* | 12/2020 | Fan | | G06N 3/08 |
| 2020/0401929 A1 | 12/2020 | Duerig et al. | | |
| 2021/0182661 A1 | 6/2021 | Li et al. | | |
| 2021/0350082 A1* | 11/2021 | Huang | | G06N 20/00 |
| 2022/0094649 A1* | 3/2022 | Le | | G06F 40/35 |
| 2022/0261631 A1* | 8/2022 | Cohen | | G06N 20/00 |
| 2022/0284283 A1* | 9/2022 | Yin | | G06N 3/04 |
| 2022/0318557 A1* | 10/2022 | Mohseni | | G06V 20/56 |
| 2023/0177746 A1* | 6/2023 | Shao | | G16H 50/20 382/131 |
| 2023/0386470 A1* | 11/2023 | Su | | G10L 15/063 |

FOREIGN PATENT DOCUMENTS

| | | |
|---|---|---|
| CN | 110674629 A | 1/2020 |
| CN | 111832701 A | 10/2020 |
| CN | 112232086 A | 1/2021 |
| CN | 112380319 A | 2/2021 |
| CN | 112395876 A | 2/2021 |
| CN | 112487182 A | 3/2021 |
| CN | 112686046 A | 4/2021 |
| CN | 113807540 A | 12/2021 |
| CN | 114154395 A | 3/2022 |
| KR | 20210094445 A | 7/2021 |
| WO | WO 2020242567 A1 | 12/2020 |

OTHER PUBLICATIONS

Tencent Technology, ISR, PCT/CN2022/112643, Nov. 16, 2022, 2 pgs.
Tencent Technology, WO, PCT/CN2022/112643, Nov. 16, 2022, 6 pgs.
Tencent Technology, IPRP, PCT/CN2022/112643, Mar. 5, 2024, 7 pgs.

* cited by examiner

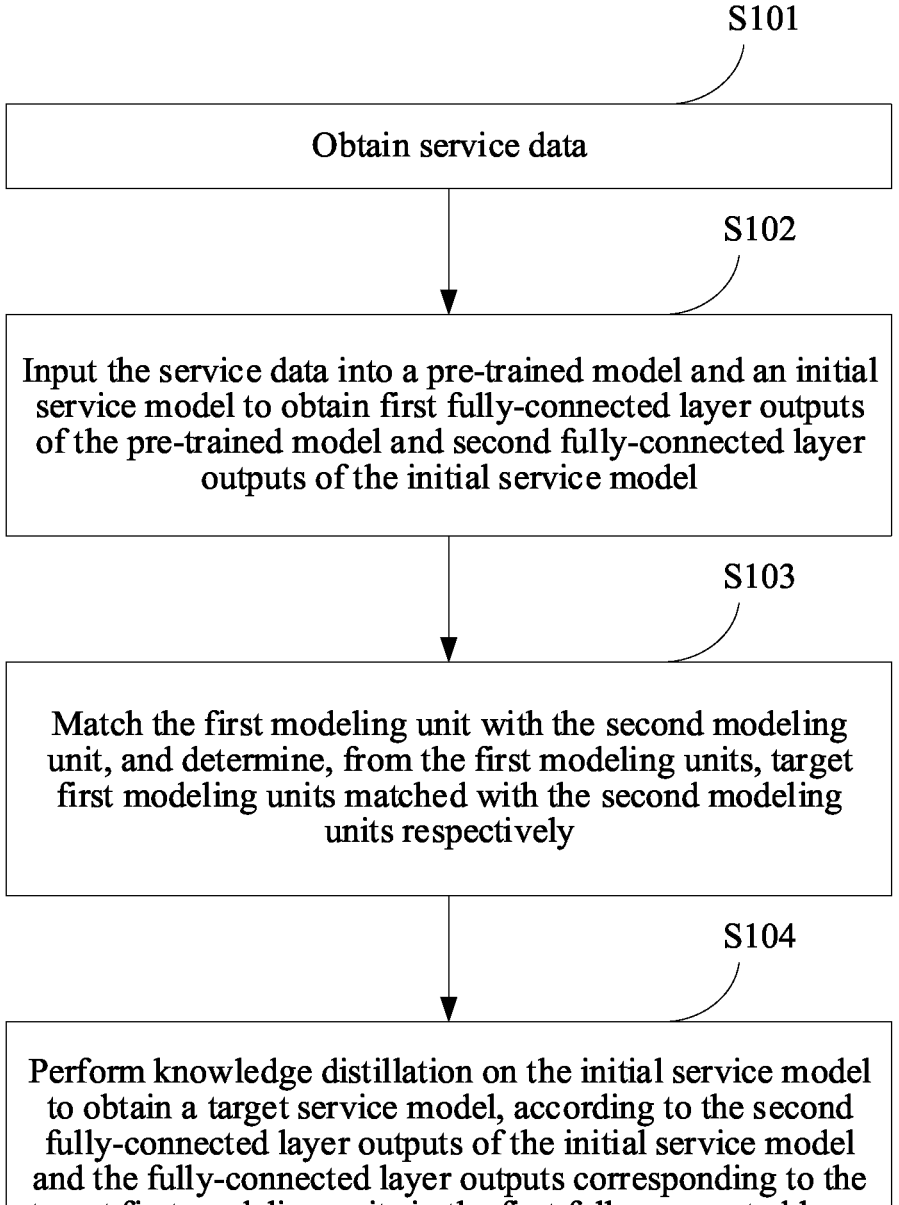

S101

Obtain service data

S102

Input the service data into a pre-trained model and an initial service model to obtain first fully-connected layer outputs of the pre-trained model and second fully-connected layer outputs of the initial service model

S103

Match the first modeling unit with the second modeling unit, and determine, from the first modeling units, target first modeling units matched with the second modeling units respectively

S104

Perform knowledge distillation on the initial service model to obtain a target service model, according to the second fully-connected layer outputs of the initial service model and the fully-connected layer outputs corresponding to the target first modeling units in the first fully-connected layer outputs

FIG. 1

DATA PROCESSING METHOD, APPARATUS, DEVICE, STORAGE MEDIUM AND PROGRAM PRODUCT

CROSS-REFERENCE TO RELATED APPLICATIONS

This application is a continuation application of PCT Patent Application No. PCT/CN2022/112643, entitled "DATA PROCESSING METHOD, APPARATUS, DEVICE, STORAGE MEDIUM AND PROGRAM PRODUCT" filed on Aug. 16, 2022, which claims priority to Chinese Patent Application No. 202111094328.0, entitled "DATA PROCESSING METHOD AND APPARATUS" filed with the China National Intellectual Property Administration on Sep. 17, 2021, all of which is incorporated herein by reference in its entirety.

FIELD OF THE TECHNOLOGY

This application relates to the field of machine learning, and in particular, to data processing.

BACKGROUND OF THE DISCLOSURE

Currently, pre-trained models have advanced rapidly. A pre-trained model can be obtained by pre-training from large-scale data through self-supervised learning. Also, the pre-trained model can transfer knowledge learned from the large-scale data into other small-scale models, so as to realize other tasks unrelated to specific tasks of the pre-trained model.

In other words, a service model can be optimized by using the pre-trained model, so that the service model can better serve other tasks.

However, in some scenarios, the pre-trained model cannot be used to optimize the service model, such that the effect of the service model cannot be improved.

SUMMARY

In view of this, embodiments of this application provide a data processing method, an apparatus, a device, a storage medium and a program product, so that the application scope of knowledge distillation is expanded and the service performance of a service model is effectively improved.

To achieve the foregoing objectives, the embodiments of this application provide the following technical solutions.

In an aspect, an embodiment of this application provides a data processing method performed by a computer device. The method includes:

obtaining service data;

inputting the service data into a pre-trained model and an initial service model to obtain first fully-connected layer outputs of the pre-trained model and second fully-connected layer outputs of the initial service model; first modeling units of the pre-trained model having a granularity different from that of second modeling units of the initial service model;

determining, from the first modeling units, target first modeling units matched with the second modeling units respectively, wherein fully-connected layer outputs of the second modeling units and fully-connected layer outputs of the matched target first modeling units have a same sequence length; and updating the initial service model to obtain a target service model, according to the second fully-connected layer outputs and the fully-connected layer outputs corresponding to the target first modeling units in the first fully-connected layer outputs.

In another aspect, an embodiment of this application provides a computer device, including:

a processor, a communication interface, a memory and a communication bus;

the processor, the communication interface and the memory communicating with each other through the communication bus; the communication interface being an interface of a communication module;

the memory being configured to store a program code and transmit the program code to the processor; the processor being configured to invoke instructions of the program code in the memory to perform the method described in the above aspects.

In yet another aspect, an embodiment of this application provides non-transitory computer readable storage medium for storing a computer program, the computer program being used for performing the method described in the above aspects.

In still another aspect, an embodiment of this application provides a computer program product including instructions, the instructions, when run on a computer, causing the computer to perform the method described in the above aspects.

Compared with related art, the embodiments of this application have the following advantages.

Obtained service data is inputted into a pre-trained model and an initial service model to obtain first fully-connected layer outputs of the pre-trained model and second fully-connected layer outputs of the initial service model. The pre-trained model and the initial service model construct the modeling units with different granularities, resulting in the sequence lengths of the first fully-connected layer outputs being different from the sequence lengths of the second fully-connected layer outputs. In this case, in order to realize the knowledge distillation of the initial service model through the pre-trained model, fully-connected layer output of the initial service model, the first modeling units of the pre-trained model can be matched with the second modeling units of the initial service model, and the fully-connected layer outputs of the second modeling units have the same sequence length as the fully-connected layer outputs of the matched target first modeling units, in such a manner that a basis for knowledge distillation is established, so that with the help of the pre-trained model, the target service model can be obtained through the initial service model, and the knowledge distillation of the models including modeling units with different granularities is realized. It thus can be seen that even if the pre-trained model and the initial service model have modeling units with different granularities, the initial service model can be optimized using the pre-trained model to obtain the target service model, so that the application scope of the knowledge distillation is expanded and the service performance of the service model is effectively improved.

BRIEF DESCRIPTION OF THE DRAWINGS

FIG. 1 is a schematic flow diagram of a data processing method provided by an embodiment of this application.

DESCRIPTION OF EMBODIMENTS

Figure 2:
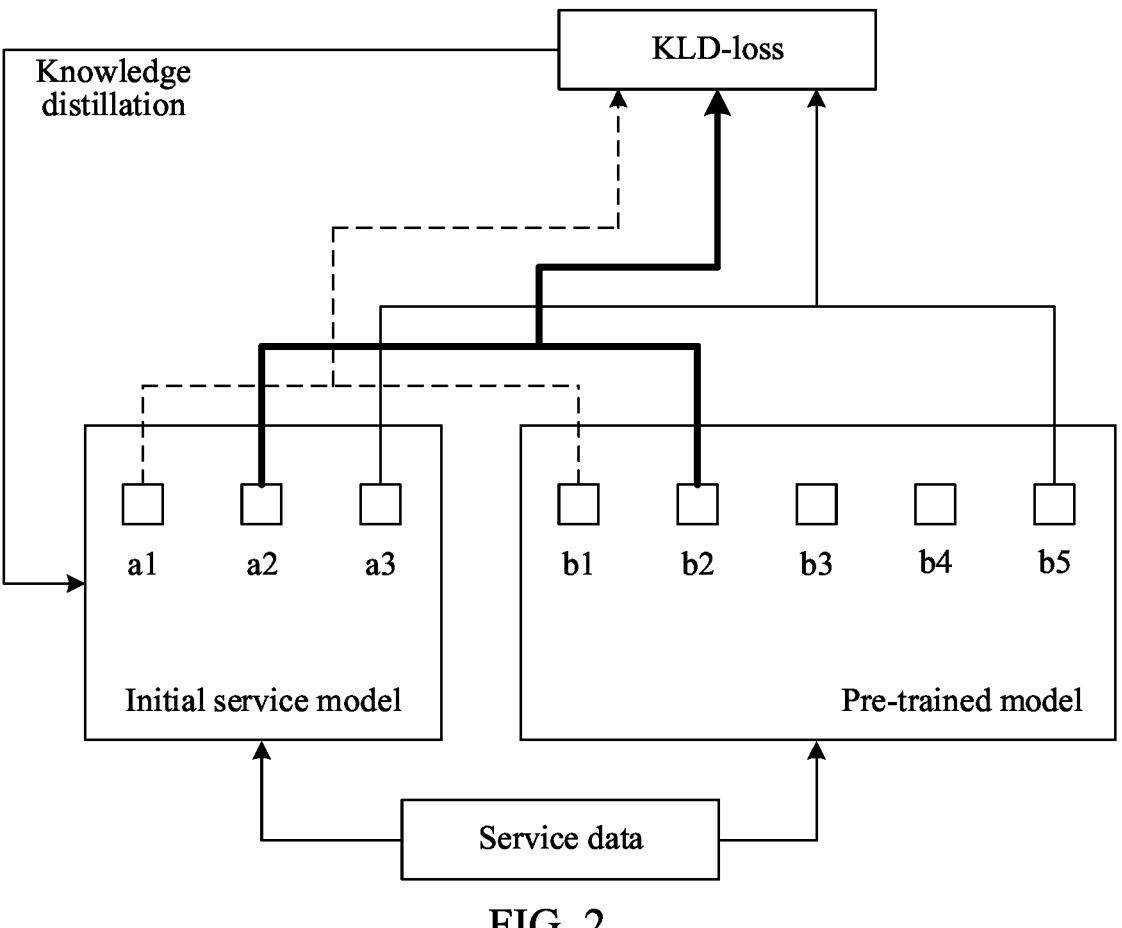
FIG. 2 is a schematic structural diagram of a data processing apparatus provided by an embodiment of this application.

In order to enable a person skilled in the art to better understand this application, the following clearly and completely describes the technical solutions of the embodiments of this application in conjunction with the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Through research, the inventors of this application have found that a service model can be optimized by a pre-trained model through knowledge distillation. However, there is a premise to use the knowledge distillation, that is, sequence lengths of fully-connected layer outputs of the pre-trained model are consistent with sequence lengths of fully-connected layer outputs of the service model. This is because when the knowledge distillation is performed, the Kullback-Leibler divergence loss (KLD loss) is to be calculated according to the fully-connected layer outputs of the pre-trained model and the fully-connected layer outputs of the service model. Descriptions are provided by using an example. The fully-connected layer outputs of the pre-trained model include three vectors, namely, w1, w2 and w3, and the fully-connected layer outputs of the service model include three vectors, namely, L1, L2 and L3, so that KLD loss=w1\*L1+w2\*L2+w3\*L3.

In some scenarios, for example, in a scenario of automatically adding punctuations to a text, the modeling unit of its corresponding service model is a phrase, while the modeling unit of the pre-trained model is a single character. One modeling unit corresponds to one fully-connected layer output, and the sequence lengths of the fully-connected layer outputs corresponding to the various modeling units are the same (for example, the dimensions of the foregoing w1, w2, w3, L1, L2 and L3 are the same). However, granularities of the modeling units of the pre-trained model and the service model are different (the pre-trained model is at character granularity, and the service model is at phrase granularity), that is, the modeling units of the pre-trained model and the service model are different in number, resulting in the sequence lengths of the fully-connected layer outputs of the service model being inconsistent with the sequence lengths of the fully-connected layer outputs of the pre-trained model, thus the knowledge distillation cannot be carried out. Descriptions are provided by using an example.

For the text "I am a Chinese man", the input of the pre-trained model includes five modeling units, namely, "I", "am", "a", "Chinese", "man". The input of the service model includes three modeling units, namely, "I", "am", "a Chinese man". Assuming that the fully-connected layer output corresponding to each modeling unit is a 5-dimensional vector, then for the pre-trained model, its fully-connected layer outputs are five 5-dimensional vectors, and for the service model, the fully-connected layer outputs of the service model are three 5-dimensional vectors. That is: the sequence lengths of the fully-connected layer outputs of the service model are inconsistent with the sequence lengths of the fully-connected layers of the pre-trained model.

For the knowledge distillation, the pre-trained model, the service model, the modeling unit and the fully-connected layer output mentioned here, it is to be explained as follows.

Knowledge distillation refers to transferring knowledge of a pre-trained model to a service model, so as to optimize the service model.

The pre-trained model includes, but is not limited to Bert, GPT and ELECTRA.

The service model includes, but is not limited to Bi-directional Long-Short Term Memory (BiLSTM) model.

The modeling unit refers to a unit established based on the granularity inputted by a model, the unit generally being a single character or a phrase including one or more characters.

The fully-connected layer output is a non-normalized label probability value vector. For example, in the scenario of adding punctuations to the text, there are four optional punctuations, then the fully-connected layer output corresponding to each modeling unit is a 5-dimensional vector, and specific values of this 5-dimensional vector are used for indicating the probabilities of the four punctuations and the probability of no punctuations. The fully-connected layer output can also be called a Logits output.

It can be appreciated that if the pre-trained model and the service model cannot perform knowledge distillation, the knowledge of a large-scale pre-trained model cannot be used to optimize a small-scale service model, so that the effect of the service model cannot be improved.

In order to solve the above-mentioned problems, an embodiment of this application provides a data processing method, which realizes the effect of performing knowledge distillation on models including modeling units with different granularities, thereby expanding the application scope of knowledge distillation and effectively improving the service performance of the service models.

The data processing method can be implemented by a computer device which can be a terminal device or a server, wherein the server can be an independent physical server, a server cluster or a distributed system including a plurality of physical servers, or a cloud server providing cloud computing services. The terminal device includes, but is not limited to, a mobile phone, a computer, an intelligent voice interaction device, an intelligent household appliance, a vehicle-mounted terminal, an aircraft, etc. The terminal device and the server can be directly or indirectly connected in a wired or wireless communication manner, and this application is not limited here.

An embodiment of this application further relates to artificial intelligence (AI). AI involves a theory, a method, a technology, and an application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/ interaction system, and electromechanical integration. AI software technologies mainly include several major directions such as a computer vision (CV) technology, a voice processing technology, a natural language processing technology, and machine learning/deep learning, autonomous driving and intelligent transportation. An embodiment of this application mainly relates to a natural language processing technology and machine learning.

Nature language processing (NLP) is an important direction in the fields of computer science and AI. NLP studies various theories and methods that can realize effective communication between people and computers in natural language. NLP is a science integrating linguistics, computer science and mathematics. Therefore, the research in this field will involve natural language, that is, the language people use daily, so it is closely related to the study of linguistics. The NLP technology usually includes text processing, semantic understanding, machine translation, robot questions and answers, knowledge mapping and other technologies.

Machine learning (ML) is a multi-field interdiscipline, and relates to a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

For example, an embodiment of this application can segment the text by the natural language technology to obtain phrases, characters, etc., and perform feature processing on a segmentation result to obtain a fully-connected layer output. Moreover, the knowledge distillation on the initial service model by the pre-trained model is also an effective form of implementing transfer learning.

Referring to FIG. 1, FIG. 1 is a schematic flow diagram of a data processing method provided by an embodiment of this application. In this embodiment, an exemplary explanation of a server as the foregoing computer device is made, and the method can be realized by the following steps S101-S104, for example.

S101: obtaining service data.

The service data mentioned in the embodiment of this application refers to data related to specific services. The embodiment of this application does not specifically limit the service data.

In a possible implementation, if the initial service model and the target service model are configured to add punctuations to an inputted text, the service data is a text without punctuations, so that the obtained target service model can have a function of marking punctuations for the text without punctuations through knowledge distillation.

The text without the punctuations can be obtained in different ways, which is not limited in this application. For example, the text can be obtained using the voice recognition technology to recognize voice.

S102: inputting the service data into a pre-trained model and an initial service model to obtain first fully-connected layer outputs of the pre-trained model and second fully-connected layer outputs of the initial service model.

First modeling units of the pre-trained model are constructed with a first granularity, second modeling units of the initial service model are constructed with a second granularity, and the first granularity and the second granularity are different.

In the embodiment of this application, the pre-trained model and the initial service model may be obtained by pre-training. In one example, the pre-trained model may be obtained by training according to pre-training data and service data. Specifically, the initial pre-trained model can be obtained by training with pre-training data, and then the initial pre-trained model can be finetuned using service data to obtain a pre-trained model based on a service task corresponding to service data. In other words, the pre-trained model mentioned in S101 may be a pre-trained model based on this service. The pre-training data mentioned here may be training data irrelevant to the service task. In general, the pre-trained model has a large data volume, and direct use of this data will affect the service processing efficiency.

It is to be explained that, the service task corresponding to the pre-training data and the service task corresponding to the service data may be different. Moreover, in a possible implementation, the data volume of the pre-training data is larger than the data volume of the service data required for training to obtain the target service model, so that the pre-training data can be trained based on relatively sufficient pre-training data, and the obtained pre-trained model has higher precision and model parameter scale.

In the embodiment of this application, the initial service model may be obtained by training with service data. It can be appreciated that the target service model is mainly applied to service tasks in relatively new fields, so that the data volume of service data that can be collected for training is generally far less than the data volume of the pre-training data, and especially for some emerging services, the data volume of service data that can be obtained is very limited. Therefore, the accuracy of the initial service model is often not very high, and the model parameter scale of the initial service model may also be smaller than the model parameter scale of the pre-trained model, so the corresponding service tasks cannot be met. With the adoption of the knowledge distillation to optimize the initial service model using the pre-trained model, if the pre-trained model is used as a teacher model in the knowledge distillation and the initial service model is used as a student model in the knowledge distillation, knowledge of the pre-trained model is effectively transferred into a target service model, so that the accuracy of the finally-obtained target service model can be effectively improved without additional service data for model training.

In the embodiment of this application, the first modeling units of the pre-trained model are constructed with a first granularity, the second modeling units of the initial service model are constructed with a second granularity, and the first granularity and the second granularity are different, resulting in the number of modeling units of the pre-trained model being inconsistent with the number of modeling units of the initial service model. Therefore, the sequence lengths of the first fully-connected layer outputs of the pre-trained model are generally greater than the sequence lengths of the second fully-connected layer outputs of the initial service model. Therefore, it is difficult to transfer knowledge of the pre-trained model into the initial service model using knowledge distillation in the related art, and the knowledge distillation between two models including modeling units with different granularities can be realized only by a method provided by an embodiment of this application, for example, by S103-S104.

In a possible implementation, when the service data is a text, the first granularity is a single character and the second granularity is a phrase. That is to say, in this implementation, since one phrase may include one or more characters, the first granularity is finer than the second granularity. Accordingly, the finally-obtained target service model can realize a service task which is at phrase granularity in the text, for example, adding punctuations and the like.

As mentioned above, for both the pre-trained model and the initial service model, one modeling unit corresponds to one fully-connected layer output. Moreover, the sequence lengths of the fully-connected layer outputs corresponding to the modeling units of the pre-trained model are the same with the sequence lengths of the fully-connected layer outputs corresponding to the modeling units of the initial service model Therefore, the sequence lengths of the fully-connected layer outputs of the pre-trained model are greater than or equal to the sequence lengths of the fully-connected layer outputs of the initial service model. Moreover, since it is less likely that each modeling unit of the initial service model only includes one character, in most cases, the sequence lengths of the fully-connected layer outputs of the pre-trained model are greater than the sequence lengths of the fully-connected layer outputs of the initial service model.

S103: matching the first modeling unit with the second modeling unit, and determining, from the first modeling units, target first modeling units matched with the second modeling units respectively.

The fully-connected layer outputs of the second modeling units have the same sequence length as the fully-connected layer outputs of the matched target first modeling units.

S104: performing knowledge distillation on the initial service model to obtain a target service model, according to the second fully-connected layer outputs of the initial service model and the fully-connected layer outputs corresponding to the target first modeling units in the first fully-connected layer outputs.

With respect to S102 and S103, it is to be explained that, the embodiment of this application does not specifically limit an execution order of S102 and S103, as long as S102 and S103 are executed between S101 and S104. S102 can be executed before S103, S102 can be executed at the same time as S103, and S102 can also be executed after S103.

With respect to S103 and S104, it is to be explained that, it is just because in most cases the sequence lengths of the fully-connected layer outputs of the pre-trained model are greater than the sequence lengths of the fully-connected layer outputs of the initial service model. As a result, if the fully-connected layer outputs of the pre-trained model and the fully-connected layer outputs of the initial service model are directly used, knowledge distillation cannot be carried out.

In view of this, in an embodiment of this application, it is possible to determine, from the first modeling units of the pre-trained model, the target first modeling units matched with the second modeling units of the initial service model, and the fully-connected layer outputs of one second modeling unit and the corresponding target first modeling unit have the same sequence length, and the target first modeling unit corresponding to the second modeling unit is determined by matching, so that the target first modeling unit and the corresponding second modeling unit are same in sequence length of its fully-connected layer output, and have correlation in the processing of service tasks, thus achieving a realization basis for knowledge distillation of the initial service model through the pre-trained model.

Then, knowledge distillation is performed on the initial service model to achieve the target service model using the second fully-connected layer outputs of the initial service model and the fully-connected layer outputs corresponding to the target first modeling units in the first fully-connected layer output. In other words, in this solution, the target first modeling units with the same sequence length as the fully-connected layer outputs of the second modeling units can be screened out from the fully-connected layer outputs of the pre-trained model, so as to perform knowledge distillation and obtain the target service model.

Descriptions are provided by using an example.

Service data is: "I am a Chinese man". The first granularity is a single character, and the second granularity is a phrase.

As shown in FIG. 2, the initial service model includes three second modeling units, namely, "I", "am", "a Chinese man", respectively corresponding to fully-connected layer outputs a1, a2 and a3. The pre-trained model includes five first modeling units, namely, "I", "am", "a", "Chinese", "man", respectively corresponding to fully-connected layer outputs b1, b2, b3, b4, b5. From the first modeling units "I", "am", "a", "Chinese", "man" of the pre-trained model, target first modeling units corresponding to the second modeling units of the initial service model are determined by matching. For example, it is determined that the target first modeling unit "I" in the pre-trained model corresponds to the second modeling unit "I" in the initial service model; it is determined that the target first modeling unit "am" in the pre-trained model corresponds to the second model unit "am" in the initial service model; it is determined that the target first modeling unit "man" in the pre-trained model corresponds to the second model unit "a Chinese man" in the initial service model. Then, a1, a2, a3 and b1, b2, b5 are used for knowledge distillation to obtain the target service model. When knowledge distillation is performed, a formula $a1*b1+a2*b2+a3*b5$ can be used to calculate KLD loss.

Descriptions are provided by further using an example.

Service data is: "I am a Chinese man". The first granularity is a single character, and the second granularity is a phrase.

The initial service model includes three second modeling units, namely, "I", "am", "a Chinese man", respectively corresponding to fully-connected layer outputs a1, a2 and a3. The pre-trained model includes five first modeling units, namely, "I", "am", "a", "Chinese", "man", respectively corresponding to fully-connected layer outputs b1, b2, b3, b4, b5. From the first modeling units "I", "am", "a", "Chinese", "man" of the pre-trained model, target first modeling units corresponding to the second modeling units of the initial service model are determined by matching. For example, it is determined that the target first modeling unit "I" in the pre-trained model corresponds to the second modeling unit "I" in the initial service model; it is determined that the target first modeling unit "am" in the pre-trained model corresponds to the second model unit "am" in the initial service model; it is determined that the target first modeling unit "a" in the pre-trained model corresponds to the second model unit "a Chinese man" in the initial service model. Then, a1, a2, a3 and b1, b2, b3 are used for knowledge distillation to obtain the target service model. When knowledge distillation is performed, a formula $a1*b1+a2*b2+a3*b3$ can be used to calculate KLD loss.

It is to be explained that, the initial service model and the target service model in the embodiment of this application can be used for processing services related to service data. In one example, the initial service model and the target service model trained based on the initial service model can be configured to add punctuations to the text. It is considered that the text automatically recognized according to voice does not include punctuations. Therefore, in some embodiments, both the service data mentioned here and the text mentioned later can be the texts automatically recognized by voice.

In the embodiment of this application, when the initial service model and the target service model can be configured to add punctuations to the text, it is considered that for a phrase, the punctuation cannot be added inside the phrase, and the punctuation may be added after the last character of the phrase. For example, for the phrase "a Chinese man", it is impossible to add the punctuation between the character "a" and the character "Chinese"; It is also impossible to add the punctuation between the character "Chinese" and the character "man". And the punctuation may be added after the character "man".

Therefore, in a possible implementation, if the first granularity is a single character and the second granularity is a phrase, S103 may include:

S1031: matching, according to a target phrase corresponding to a target second modeling unit, a target character set constituting the target phrase from the first modeling units, the target character set containing a plurality of characters;

S1032: determining, from the target character set, a first modeling unit corresponding to the last character as a target first modeling unit matched with the target second modeling unit, based on a word order.

For the convenience of description, if the target phrase corresponding to one second modeling unit has multiple characters, the second modeling unit is denoted as the target second modeling unit, the multiple characters corresponding to the target phrase constitute the target character set, and the multiple characters have corresponding first modeling units in the pre-trained model.

Based on the foregoing making rules for punctuations, the first modeling unit corresponding to the last character in a semantic direction in the target character set can be determined as the target first modeling unit based on the word order of the text in the service data.

Descriptions are provided by using an example, if the target character set is {"a", "Chinese", "man"}, and the target phrase is "a Chinese man", the first modeling unit corresponding to the last character "man" in the target character set is determined as the target first modeling unit matched with the target phrase.

As can be seen from the above description, even if the sequence lengths of the first fully-connected layer outputs of the pre-trained model are greater than the sequence lengths of the second fully-connected layer outputs of the initial service model, the first modeling units of the pre-trained model can be matched with the second modeling units of the initial service model, and the fully-connected layer outputs of the second modeling units have the same sequence length as the fully-connected layer outputs of the matched target first modeling units, in such a manner that a basis for knowledge distillation is established, so that with the help of the pre-trained model, the target service model can be obtained through the initial service model, and the knowledge distillation of the models including modeling units with different granularities is realized. It thus can be seen that even if the pre-trained model and the initial service model have modeling units with different granularities, the initial service model can be optimized using the pre-trained model to obtain the target service model, so that the application scope of the knowledge distillation is expanded and the service performance of the service model is effectively improved.

In an implementation of an embodiment of this application, after the target service model is obtained, the target service model can be configured to process related services. In one example, if the target service model is configured to add punctuations to the text, the method may further include the following steps A-D.

Step A: obtaining voice data.

The voice data can be data recorded in real time by a user through a microphone, or data recorded in advance and stored by the user, and it is not limited here.

Step B: recognizing the voice data to obtain a target text corresponding to the voice data.

In the embodiment of this application, specific contents of the voice data can be recognized using the voice recognition technology, so as to obtain the text corresponding to the voice data. The voice recognition technology will not be described in detail here.

Step C: adding punctuations to the target text using the target service model.

Step D: outputting the target text added with the punctuations.

Since the target text obtained according to voice recognition does not include punctuations, after the target text corresponding to voice data is obtained, punctuations can be added to the target text using the target service model, and the target text added with the punctuations can be further outputted.

The outputting the target text added with the punctuations mentioned here can be, for example, displaying the target text added with the punctuations in a text input area. Through steps A-D, the target text including the punctuations can be automatically obtained from the voice data.

With respect to step A and step D, descriptions are provided by using an example in combination with specific scenarios.

In an instant messaging scenario, if it is inconvenient for the user to manually input a text, then the microphone can be invoked to record voice data. Then, a device installed with an instant messaging software can receive the voice data recorded by the user, further recognize the voice data, and use the target service model to add punctuations to a target text corresponding to the voice data. Then, in an input area of an instant messaging page, the target text added with the punctuations is inputted.

It is to be explained that, the above example is only an application scenario of this application, and the scenario to which the solution provided by the embodiment of this application is applicable is not limited to the above.

Exemplary Device

Based on the method provided in the above embodiment, an embodiment of this application further provides an apparatus, which will be introduced in conjunction with the attached drawings below.

Figure 3:
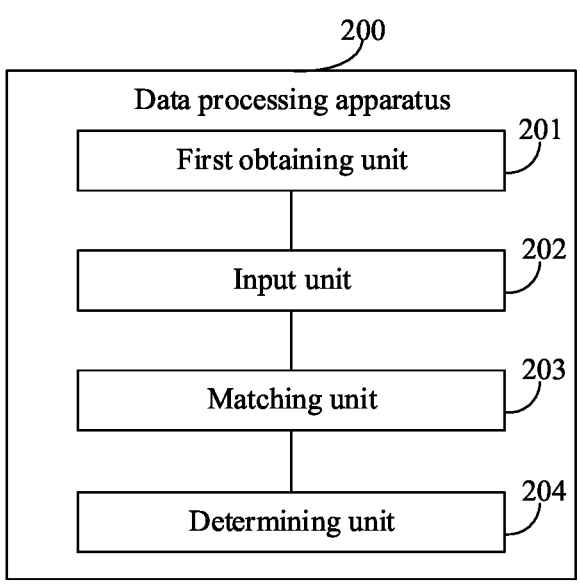
FIG. 3 is a schematic structural diagram of a client provided by an embodiment of this application.

Referring to FIG. 3, FIG. 3 is a schematic structural diagram of a data processing apparatus provided by an embodiment of this application. The data processing apparatus 200 may specifically include, for example: a first obtaining unit 201, an input unit 202, a matching unit 203 and a determining unit 204.

The first obtaining unit 201 being configured to obtain service data;

the input unit 202 being configured to input the service data into a pre-trained model and an initial service model to obtain first fully-connected layer outputs of the pre-trained model and second fully-connected layer outputs of the initial service model; first modeling units of the pre-trained model being constructed with a first granularity, second modeling units of the initial service model being constructed with a second granularity, the first granularity and the second granularity being different;

the matching unit 203 being configured to match the first modeling units with the second modeling units, and determine, from the first modeling units, target first modeling units matched with the second modeling units respectively, fully-connected layer outputs of the second modeling units and fully-connected layer outputs of the matched target first modeling units having a same sequence length;

the determining unit 204 being configured to perform knowledge distillation on the initial service model to obtain a target service model, according to the second fully-connected layer outputs and the fully-connected layer outputs corresponding to the target first modeling units in the first fully-connected layer outputs.

In some embodiments, when the service data is a text, the first granularity is a single character and the second granularity is a phrase.

In some embodiments, the initial service model and the target service model are configured to add punctuations to the inputted text.

In some embodiments, if the first granularity is a single character and the second granularity is a phrase, for the target second modeling unit in the second modeling units, the matching unit 203 is configured to:

matching, according to a target phrase corresponding to a target second modeling unit, a target character set constituting the target phrase from the first modeling units, the target character set containing a plurality of characters;

determine, from the target character set, a first modeling unit corresponding to the last character as a target first modeling unit matched with the target second modeling unit, based on a word order.

In some embodiments, the apparatus further includes:

a second obtaining unit configured to obtain voice data;

a recognition unit configured to recognize the voice data to obtain a target text corresponding to the voice data;

a processing unit configured to add punctuations to the target text using the target service model;

an output unit configured to output the target text with the punctuations added.

In some embodiments, the service data is a text without the punctuations.

In some embodiments, a model parameter scale of the pre-trained model is larger than a model parameter scale of the initial service model;

the pre-trained model being obtained by self-supervised training based on pre-training data, and a data volume of the pre-training data being greater than a data volume of service data required for training to obtain the target service model.

As the apparatus 200 is an apparatus corresponding to the method provided in the above method embodiment, specific implementation of various units of the apparatus 200 is the same as the above method embodiment. Therefore, the specific implementation of various units of the apparatus 200 can refer to the description of the above method embodiment, and will not be repeated here.

An embodiment of this application further provides a computer device, which is the computer device described above. The computer device may include a terminal device or a server, and the foregoing data processing apparatus can be configured in the computer device. The computer device will be introduced in conjunction with the attached drawings below.

Figure 4:
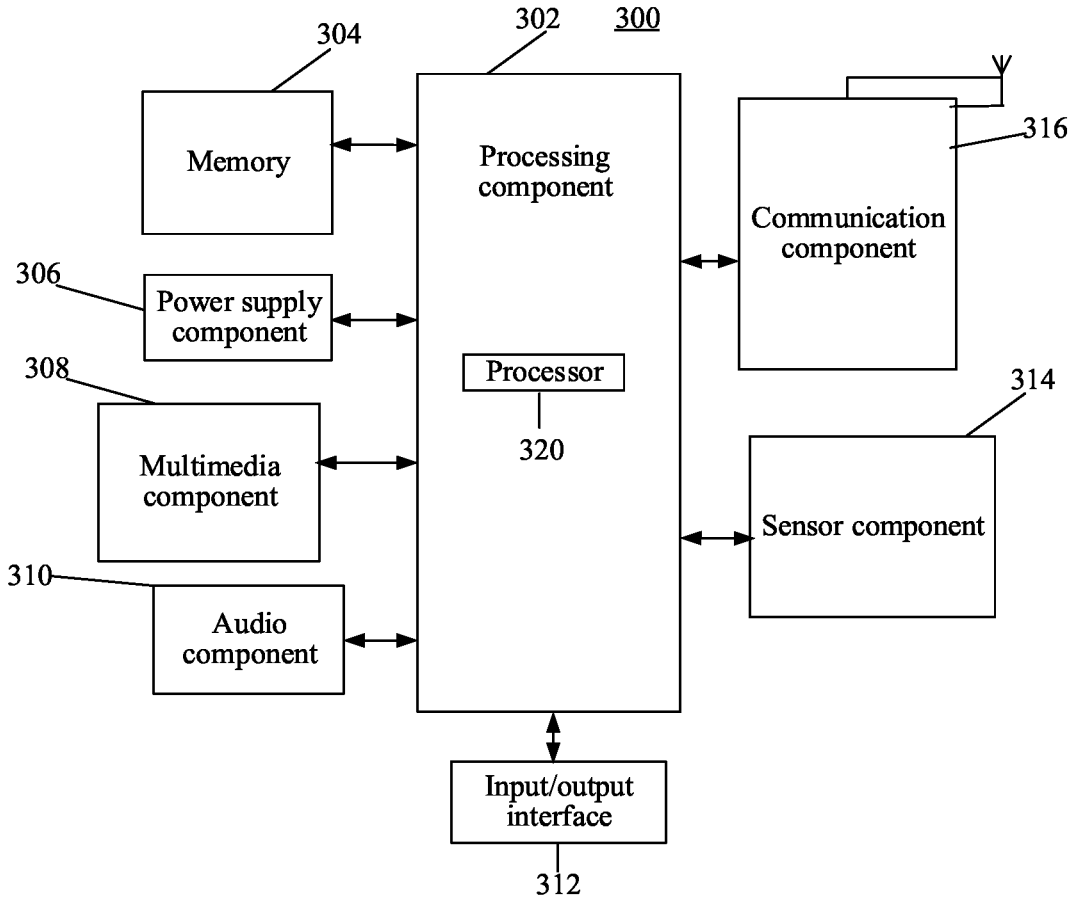
FIG. 4 is a schematic structural diagram of a server provided by an embodiment of this application.

FIG. 4 shows a block diagram of a terminal device 300. For example, the terminal device 300 may be a mobile phone, a computer, a digital broadcasting terminal, a messaging device, a game console, a tablet device, a medical device, a fitness facility, a personal digital assistant, or the like.

Referring to FIG. 4, the terminal device 300 may include one or more of the following components: a processing component 302, a memory 304, a power supply component 306, a multimedia component 308, an audio component 310, an input/output (I/O) interface 33, a sensor component 314, and a communication component 316.

The processing component 302 usually controls the whole operation of the terminal device 300, such as operations associated with displaying, a phone call, data communication, a camera operation, and a recording operation. The processing component 302 may include one or more processors 320 to execute instructions, to complete all or some steps of the foregoing method. In addition, the processing component 302 may include one or more modules, to facilitate the interaction between the processing component 302 and other assemblies. For example, the processing component 302 may include a multimedia module, to facilitate the interaction between the multimedia component 308 and the processing component 302.

The memory 304 is configured to store various types of data to support operations at the terminal device 300.

The power supply component 306 provides power to various assemblies of the terminal device 300.

The multimedia component 308 includes a screen providing an output interface between the terminal device 300 and a user.

The audio component 310 is configured to output and/or input an audio signal.

The I/O interface provides an interface between the processing component 302 and a peripheral interface module.

The sensor component 314 includes one or more sensors, configured to provide status evaluation of various aspects to the terminal device 300.

The communication component 316 is configured to facilitate a wired or wireless communication between the terminal device 300 and other devices.

In an exemplary embodiment, the terminal device 300 can be implemented by one or more application specific integrated circuits (ASIC), a digital signal processor (DSP), a digital signal processing device (DSPD), a programmable logic device (PLD), a field programmable gate array (FPGA), a controller, a micro-controller, a microprocessor or other electronic element, so as to perform the following method, including:

obtaining service data;

inputting the service data into a pre-trained model and an initial service model to obtain first fully-connected layer outputs of the pre-trained model and second fully-connected layer outputs of the initial service model; first modeling units of the pre-trained model being constructed with a first granularity, second modeling units of the initial service model being constructed with a second granularity, the first granularity and the second granularity being different;

matching the first modeling units with the second modeling units, and determining, from the first modeling units, target first modeling units matched with the second modeling units respectively, fully-connected layer outputs of the second modeling units and fully-connected layer outputs of the matched target first modeling units having a same sequence length;

performing knowledge distillation on the initial service model to obtain a target service model, according to the second fully-connected layer outputs and the fully-connected layer outputs corresponding to the target first modeling units in the first fully-connected layer outputs.

Figure 5:
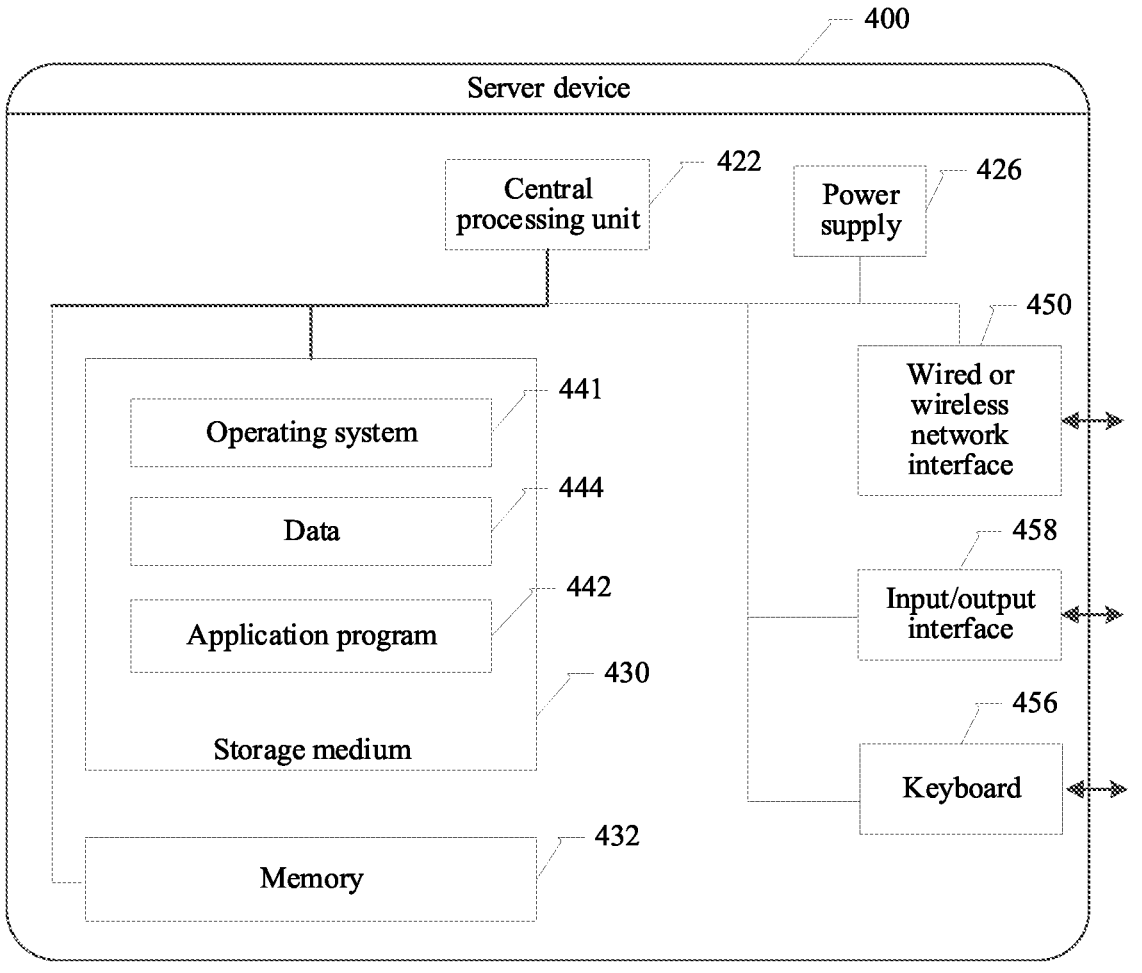
FIG. 5 is a schematic structural diagram of a server according to an embodiment of the present application.

If the computer device is a server, an embodiment of this application further provides a server. Referring to FIG. 5, FIG. 5 is a schematic structural diagram of a server according to an embodiment of the present application. The server 400 may greatly differ due to different configurations or performances, may include one or more central processing units (CPUs) 422 (for example, one or more processors), a memory 432, and one or more storage mediums 430 storing an application program 442 or data 444 (for example, one or more mass storage devices). The memory 432 and the storage medium 430 may be temporary storage or permanent storage. A program stored in the storage medium 430 may include one or more modules (which are not marked in the figure), and each module may include a series of instruction operations on the server. Further, the CPU 422 may be set to communicate with the storage medium 430, and perform, on the server 400, the series of instruction operations in the storage medium 430.

The server 400 may further include one or more power supplies 426, one or more wired or wireless network interfaces 450, one or more input/output interfaces 456, one or more keyboards 456, and/or, one or more operating systems 441, for example, Windows Server™, Mac OS X™, Unix™, Linux™, FreeBSD™, etc.

The steps performed by the server in the foregoing embodiment may be based on the server structure shown in FIG. 5.

In addition, an embodiment of this application further provides a storage medium for storing a computer program, the computer program being used for performing the method provided in the above embodiment.

An embodiment of this application further provides a computer program product including instructions, the instructions, when run on a computer, causing the computer to perform the method provided in the above embodiments.

After considering the specification and practicing the present disclosure, a person skilled in the art may easily conceive of other implementations of this application. This application is intended to cover any variation, use, or adaptive change of this application. These variations, uses, or adaptive changes follow the general principles of this application and include common general knowledge or common technical means, which are not disclosed in the present disclosure, in the art. The specification and the embodiments are considered as merely exemplary, and the true scope and spirit of this application are pointed out in the following claims.

It is to be understood that this application is not limited to the precise structures described above and shown in the accompanying drawings, and various modifications and changes can be made without departing from the scope of this application. The scope of this application is only defined by the appended claims.

The foregoing descriptions are merely exemplary embodiments of this application, and are not intended to limit this application. Any modification, equivalent replacement, improvement and the like made within the spirit and principle of this application shall fall within the protection scope of this application.

In this application, the term "unit" (e.g., the units in FIG. 3) and other equivalent terms (e.g., module) in this application refer to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Units implemented in software are stored in memory or non-transitory computer-readable medium. The software units, which include computer instructions or computer code, stored in the memory or medium can run on a processor or circuitry (e.g., ASIC, PLA, DSP, FPGA, or any other integrated circuit) capable of executing computer instructions or computer code. Each unit can be implemented using one or more processors (or processors and memory). Likewise, a processor (or processors and memory) can be used to implement one or more units. Moreover, each unit can be part of an overall unit that includes the functionalities of the unit. Units can be combined, integrated, separated, and/or duplicated to support various applications. Also, a function being performed at a particular unit can be performed at one or more other units and/or by one or more other devices instead of or in addition to the function performed at the particular unit. Further, units can be implemented across multiple devices and/or other components local or remote to one another. Additionally, units can be moved from one device and added to another device, and/or can be included in both devices.

What is claimed is:

1. A method performed by a computer device, the method comprising:

obtaining service data;

inputting the service data into a pre-trained model and an initial service model to obtain first fully-connected layer outputs of the pre-trained model and second fully-connected layer outputs of the initial service model, wherein:

each of first modeling units of the pre-trained model is a single character, each of second modeling units of the initial service model is a phrase, the pre-trained model is obtained by training based on both pre-training data and the service data, and the initial service model is obtained by training based on the service data;

determining, from the first modeling units, target first modeling units matched with the second modeling units respectively, wherein fully-connected layer outputs of the second modeling units and fully-connected layer outputs of the matched target first modeling units have a same sequence length; and performing knowledge distillation by utilizing the second fully-connected layer outputs of the initial service model and the fully-connected layer outputs corresponding to the matched target first modeling units in the first fully-connected layer outputs of the pre-trained model to obtain a target service model.

2. The method according to claim 1, wherein the service data is a string of text, the first modeling units of the pre-trained model have a granularity of a single character and the second modeling units of the initial service model have a granularity of a phrase.

3. The method according to claim 1, wherein the service data is a string of text without punctuations, the method further comprises:

adding punctuations to the string of text using the target service model.

4. The method according to claim 1, where the determining, from the first modeling units, the target first modeling unit matched with the second modeling units respectively comprises:

matching, according to a target phrase corresponding to a target second modeling unit, a target character set constituting the target phrase from the first modeling units, the target character set containing a plurality of characters; and determine, from the target character set, a first modeling unit corresponding to the last character as a target first modeling unit matched with the target second modeling unit, based on a word order.

5. The method according to claim 1, wherein the service data is voice data and the method further comprises:

obtaining voice data;

recognizing the voice data to obtain a target text corresponding to the voice data;

adding punctuations to the target text using the target service model;

outputting the target text added with the punctuations.

6. The method according to claim 1, wherein the pre-trained model is obtained by self-supervised training based on pre-training data, and a data volume of the pre-training data is greater than a data volume of service data required for training to obtain the target service model.

7. A computer device comprising:

a processor, a communication interface, a memory and a communication bus;

the processor, the communication interface and the memory communicating with each other through the communication bus; the communication interface being an interface of a communication module;

the memory being configured to store a program code and transmit the program code to the processor;

the processor being configured to invoke instructions in the memory to perform a data processing method including:

obtaining service data;

inputting the service data into a pre-trained model and an initial service model to obtain first fully-connected layer outputs of the pre-trained model and second fully-connected layer outputs of the initial service model, wherein:

each of first modeling units of the pre-trained model is a single character, each of second modeling units of the initial service model is a phrase, the pre-trained model is obtained by training based on both pre-training data and the service data, and the initial service model is obtained by training based on the service data;

determining, from the first modeling units, target first modeling units matched with the second modeling units respectively, wherein fully-connected layer outputs of the second modeling units and fully-connected layer outputs of the matched target first modeling units have a same sequence length; and performing knowledge distillation by utilizing the second fully-connected layer outputs of the initial service model and the fully-connected layer outputs corresponding to the matched target first modeling units in the first fully-connected layer outputs of the pre-trained model to obtain a target service model.

8. The computer device according to claim 7, wherein the service data is a string of text, the first modeling units of the pre-trained model have a granularity of a single character and the second modeling units of the initial service model have a granularity of a phrase.

9. The computer device according to claim 7, wherein the service data is a string of text without punctuations, the data processing method further comprises:

adding punctuations to the string of text using the target service model.

10. The computer device according to claim 7, where the determining, from the first modeling units, the target first modeling unit matched with the second modeling units respectively comprises:

matching, according to a target phrase corresponding to a target second modeling unit, a target character set constituting the target phrase from the first modeling units, the target character set containing a plurality of characters; and determine, from the target character set, a first modeling unit corresponding to the last character as a target first modeling unit matched with the target second modeling unit, based on a word order.

11. The computer device according to claim 7, wherein the service data is voice data and the method further comprises:

obtaining voice data;

recognizing the voice data to obtain a target text corresponding to the voice data;

adding punctuations to the target text using the target service model;

outputting the target text added with the punctuations.

12. The computer device according to claim 7, wherein the pre-trained model is obtained by self-supervised training based on pre-training data, and a data volume of the pre-training data is greater than a data volume of service data required for training to obtain the target service model.

13. A non-transitory computer readable storage medium, having stored thereon a computer program that, when executed by a processor of a computer device, causes the computer device to perform a data processing method including:

obtaining service data;

inputting the service data into a pre-trained model and an initial service model to obtain first fully-connected layer outputs of the pre-trained model and second fully-connected layer outputs of the initial service model, wherein:

each of first modeling units of the pre-trained model is a single character, each of second modeling units of the initial service model is a phrase, the pre-trained model is obtained by training based on both pre-training data and the service data, and the initial service model is obtained by training based on the service data;

determining, from the first modeling units, target first modeling units matched with the second modeling units respectively, wherein fully-connected layer outputs of the second modeling units and fully-connected layer outputs of the matched target first modeling units have a same sequence length; and performing knowledge distillation by utilizing the second fully-connected layer outputs of the initial service model and the fully-connected layer outputs corresponding to the matched target first modeling units in the first fully-connected layer outputs of the pre-trained model to obtain a target service model.

14. The non-transitory computer readable storage medium according to claim 13, wherein the service data is a string of text, the first modeling units of the pre-trained model have a granularity of a single character and the second modeling units of the initial service model have a granularity of a phrase.

15. The non-transitory computer readable storage medium according to claim 13, wherein the service data is a string of text without punctuations, the data processing method further comprises:

adding punctuations to the string of text using the target service model.

16. The non-transitory computer readable storage medium according to claim 13, where the determining, from the first modeling units, the target first modeling unit matched with the second modeling units respectively comprises:

matching, according to a target phrase corresponding to a target second modeling unit, a target character set constituting the target phrase from the first modeling units, the target character set containing a plurality of characters; and determine, from the target character set, a first modeling unit corresponding to the last character as a target first modeling unit matched with the target second modeling unit, based on a word order.

17. The non-transitory computer readable storage medium according to claim 13, wherein the service data is voice data and the method further comprises:

obtaining voice data;

recognizing the voice data to obtain a target text corresponding to the voice data;

adding punctuations to the target text using the target service model;

outputting the target text added with the punctuations.

18. The non-transitory computer readable storage medium according to claim 13, wherein the pre-trained model is obtained by self-supervised training based on pre-training data, and a data volume of the pre-training data is greater than a data volume of service data required for training to obtain the target service model.

\* \* \* \* \*